Feb. 28, 1950     E. A. SNOW     2,498,865
GAUGE FOR CUTOFF SAW TABLES

Filed July 18, 1946     2 Sheets-Sheet 1

Inventor

*E. A. Snow*

By *C. A. Snow & Co.*, Attorneys.

Feb. 28, 1950 E. A. SNOW 2,498,865
GAUGE FOR CUTOFF SAW TABLES
Filed July 18, 1946 2 Sheets-Sheet 2
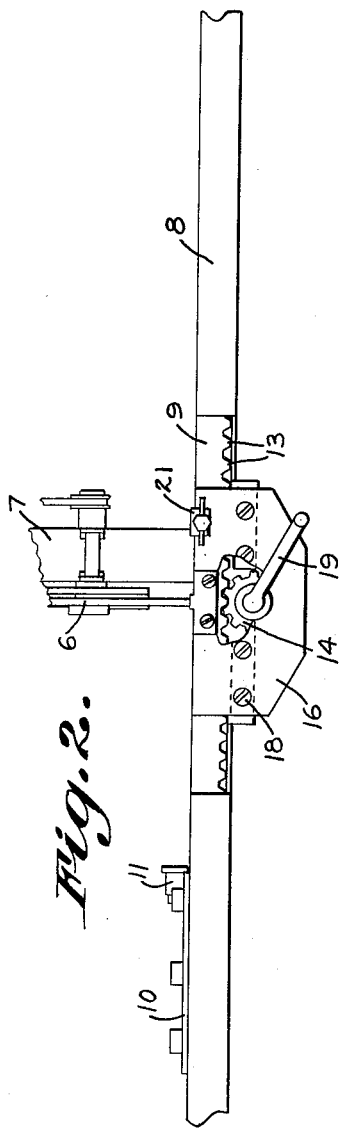
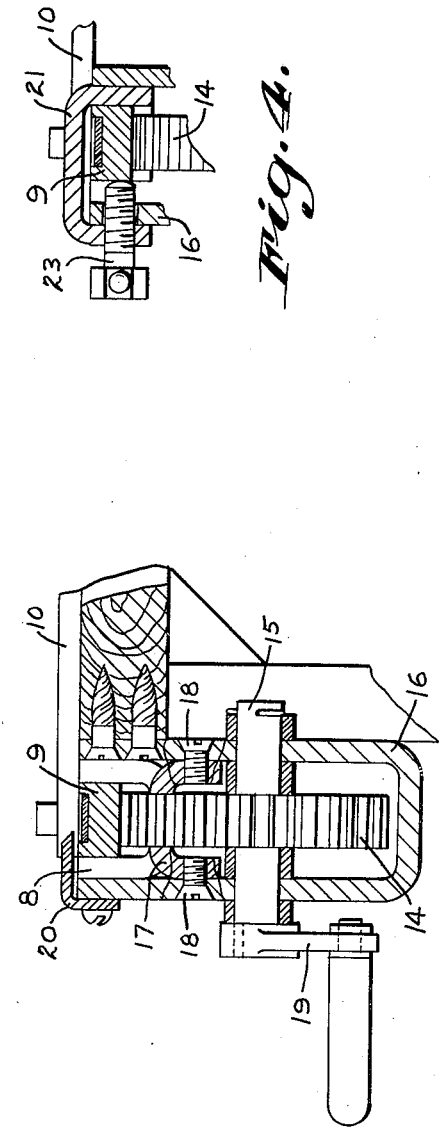
Inventor
*E. A. Snow*
By *C. A. Snow & Co.* Attorneys Patented Feb. 28, 1950

2,498,865

UNITED STATES PATENT OFFICE 2,498,865

GAUGE FOR CUTOFF SAW TABLES

Eugene Albert Snow, Lynwood, Calif.

Application July 18, 1946, Serial No. 684,506

3 Claims. (Cl. 143—176)

This invention relates to saw tables and particularly saw tables on which cut-off saws or abrasive wheels operate.

An important object of the invention is to provide an attachment which may be readily and easily installed on cut-off saw tables, whereby the length of material to be cut may be readily and accurately gauged.

Another object of the invention is to provide a gauge of this character which may be adjusted by the operator from his position at the saw table insuring an accurate and fast adjustment of the gauge.

With the foregoing and other objects in view which will appear as the description proceeds, the invention consists of certain novel details of construction and combinations of parts hereinafter more fully described and pointed out in the claims, it being understood that changes may be made in the construction and arrangement of parts or method of operating without departing from the spirit of the invention as claimed.

In the accompanying drawings the preferred forms of the invention have been shown.

Referring to the drawings:

Figure 2 is a front elevational view thereof.

Figure 3 is a vertical sectional view through the gear housing of the attachment.

Figure 4 is a sectional view through the securing means used in securing the gauge in its positions of adjustment.

Figure 1:
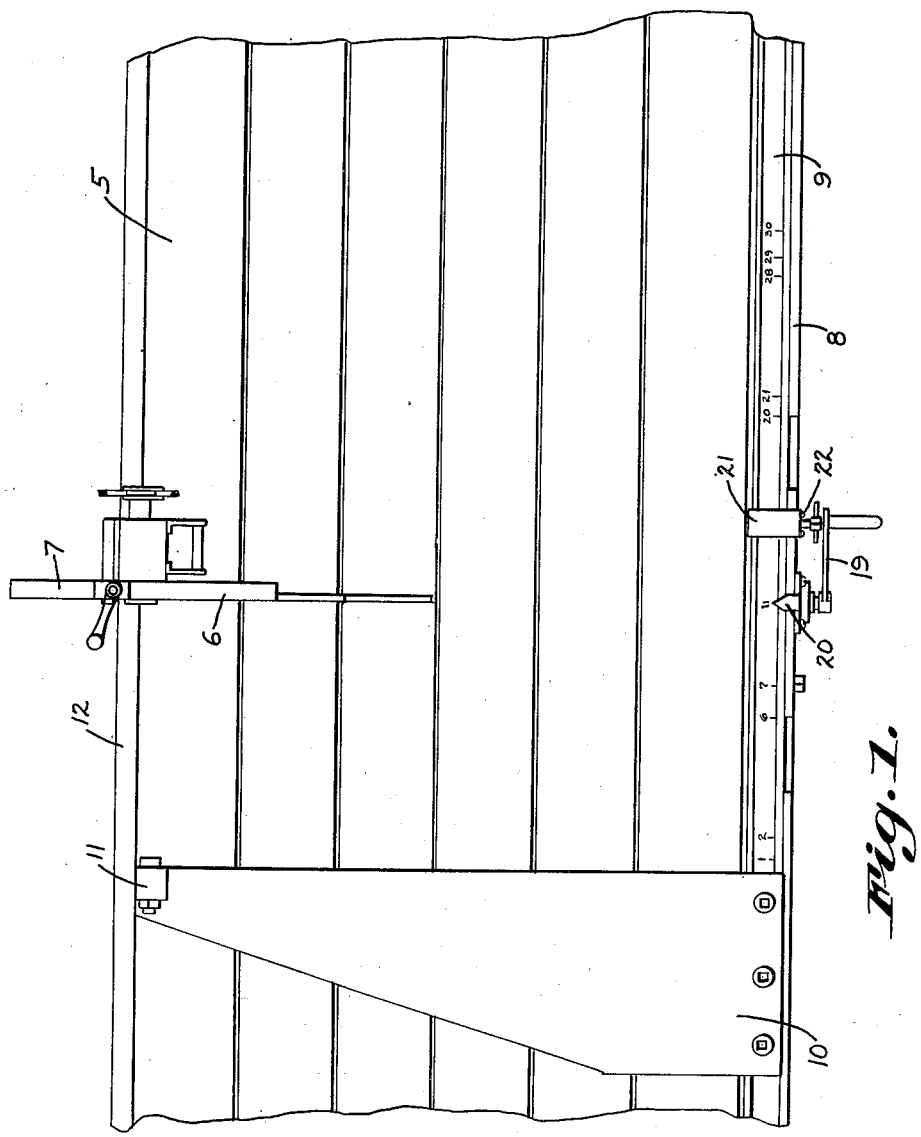
Figure 1 is a fragmental plan view of a cut-off saw table equipped with a gauge, constructed in accordance with the invention.

Referring to the drawings in detail, the reference character 5 indicates a cut-off saw table, and the reference character 6 indicates the cut-off saw which is mounted adjacent to the table and supported by the frame 7, secured in the usual way to the edge of the cut-off table.

Along the forward edge of the cut-off table is a channel bar 8 in which the gauge bar 9 operates, the gauge bar 9 being formed with graduations disposed along the upper surface thereof, where they are clearly visible to the operator of the saw.

Secured at one end of the gauge bar 9 is a gauge arm 10 which is substantially wide, and extends transversely across the table 5, as clearly shown by Figure 1 of the drawings. At the free end of the gauge arm 10 is the adjustable stop 11 that engages the bar 12 that runs along the rear edge of the table, to secure the gauge arm in position.

The lower edge of the gauge bar 9 is formed with teeth 13 which extend throughout the length of the gauge bar, the teeth 13 of the gauge bar cooperating with the gear 14 mounted on the shaft 15 that in turn is mounted in bearings formed in the gear housing 16. The gear housing 16 is secured to the downwardly extended flanges 17 that are formed integral with the channel bar 8 by means of the screws 18, shown more clearly by Figure 3 of the drawings. A shaft 15 is operated by means of the crank 19 that extends forwardly from one end of the shaft 15.

The reference character 20 indicates the indicating finger that is secured to the gear housing 16 and overlies the upper surface of the gauge bar 9 to indicate distance of movement of the gauge bar and gauge arm 10, to accomplish the purpose of the invention.

Mounted on the table, and overlying the gauge bar 9, at a point adjacent to the center of the cut-off saw table, is a yoke 21 that extends forwardly and is secured to the gear housing 16 by means of the screws 22. The yoke 21 is provided with a threaded opening that registers with an opening in the gear housing, to accommodate the securing screw 23, the inner end of the securing screw 23 adapted to engage the channel bar 8, securing the channel bar in its positions of adjustment to insure the true gauging of the material under operation.

In the use of the device, the securing screw 23 is loosened to permit of free movement of the gauge bar and gauge arm, when the crank 19 is operated. If a length of wood to be cut is seven feet the crank 19 is operated to move the channel bar until the numeral "7" of the gauge bar falls under the indicating finger 20. This movement positions the gauge arm 10 with respect to the table so that a board placed against the edge of the gauge arm will be held in such position that when the cut-off saw is operated to cut the wood a seven foot length will be cut.

It will of course be understood that after each adjustment of the gauge bar or gauge arm, the gauge is secured by means of the securing screw 23 to hold the gauge in its desired position.

Should it be desired to adjust the gauge bar for cutting a different length, it is only necessary to loosen the securing screw 23 and rotate the crank 19 to move the gauge bar and gauge arm to the described position, after which the securing screw is set to hold the gauge against movement while the saw is in operation.

It might be further stated that this invention has been designed primarily to facilitate accurate cutting to length on detail work, of any material, regardless of method used in operating.

Having thus described the invention what is claimed is:

1. The combination with a cut-off saw and table, of a gauge embodying a channel member secured along the front edge of the table, a gauge bar slidably mounted within the channel bar and having graduations formed thereon, said gauge bar having teeth formed along the lower surface thereof, portions of the channel bar being extended downwardly, providing opposed flanges, a gear housing substantially U-shaped fitted over the downwardly extended portions of the channel bar and secured thereto, a gear operating within the gear housing, said gear engaging the teeth of the gauge bar whereby said gauge bar is moved longitudinally of the channel bar, means for operating the gear, and a gauge arm secured to the gauge bar and being disposed transversely of the table providing a stop against which lumber being cut is held during the cutting operation.

2. A gauge attachment for a saw table and the like, said table having a front longitudinal edge, said attachment comprising an elongated upwardly facing channel member secured to said table edge with the edges of the channel flanges flush with the top thereof, a gauge bar having linear graduations on its upper face and slidably fitting within said channel member, said upper face also being flush with the table top, teeth formed along the lower face of the gauge bar, the web connecting the flanges of the channel member having an opening intermediate its ends, a gear having a fixed axle below the channel and extending through the opening therein and engaging the teeth of the gauge bar, a housing for said gear and secured to the channel, said axle being journaled in the housing, an operating handle for rotating the gear to effect longitudinal adjustment of the gauge bar, and a material locating gauge arm secured to the mentioned upper surface of the gauge bar at one end thereof and extending transversely along the top of the table.

3. A gauge attachment for a saw table and the like, said table having a front longitudinal edge, said attachment comprising an elongated upwardly facing channel member secured to said table edge with the edges of the channel flanges flush with the top thereof, a gauge bar having linear graduations on its upper face and slidably fitting within said channel member, said upper face also being flush with the table top, teeth formed along the lower face of the gauge bar, the web connecting the flanges of the channel member having an opening intermediate its ends, a gear having a fixed axle below the channel and extending through the opening therein and engaging the teeth of the gauge bar, a housing for said gear and secured to the channel, said axle being journaled in the housing, an operating handle for rotating the gear to effect longitudinal adjustment of the gauge bar, a material locating gauge arm secured to the mentioned upper surface of the gauge bar at one end thereof and extending transversely along the top of the table, an indicator associated with the mentioned graduations and carried between the ends of the housing to be remote from the gauge arm whereby an operator at a station in front of said housing can adjust the position of said arm without attention thereto.

EUGENE ALBERT SNOW.

REFERENCES CITED

The following references are of record in the file of this patent:

UNITED STATES PATENTS

| Number | Name | Date |
| --- | --- | --- |
| 1,028,529 | Bemis | June 4, 1912 |
| 1,788,920 | Loeffler | Jan. 13, 1931 |
| 1,938,548 | Tautz | Dec. 5, 1933 |
| 1,942,873 | Narrow | Jan. 9, 1934 |
| 2,166,703 | Boice | July 18, 1939 |